US010626959B2

(12) United States Patent
Okamoto et al.

(10) Patent No.: US 10,626,959 B2
(45) Date of Patent: Apr. 21, 2020

(54) VARIABLE-SPEED SPEED-UP MECHANISM

(71) Applicant: MITSUBISHI HEAVY INDUSTRIES COMPRESSOR CORPORATION, Tokyo (JP)

(72) Inventors: Yoshiyuki Okamoto, Hiroshima (JP); Masahiro Kobayashi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 23 days.

(21) Appl. No.: 16/088,712

(22) PCT Filed: Jul. 19, 2017

(86) PCT No.: PCT/JP2017/026077
§ 371 (c)(1),
(2) Date: Sep. 26, 2018

(87) PCT Pub. No.: WO2018/030087
PCT Pub. Date: Feb. 15, 2018

(65) Prior Publication Data
US 2019/0113111 A1    Apr. 18, 2019

Related U.S. Application Data

(63) Continuation of application No. PCT/JP2016/073562, filed on Aug. 10, 2016.

(30) Foreign Application Priority Data

Aug. 10, 2016  (WO) .................. PCT/JP2016/073562

(51) Int. Cl.
*F16H 61/12*  (2010.01)
*F16H 3/72*  (2006.01)
(Continued)

(52) U.S. Cl.
CPC ............. *F16H 3/725* (2013.01); *F16H 3/724* (2013.01); *H02K 7/108* (2013.01); *H02K 7/116* (2013.01);
(Continued)

(58) Field of Classification Search
CPC ....... Y10T 477/32; F16H 3/725; F16H 3/724; F16H 3/727; F16H 3/728; F16H 61/12;
(Continued)

(56) References Cited

U.S. PATENT DOCUMENTS 10,177,692 B2 *   1/2019   Kobayashi ............. H02K 7/116
2005/0113201 A1   5/2005   Kimura et al.
(Continued)

FOREIGN PATENT DOCUMENTS

JP      2004-150609 A      5/2004
JP      4472350 B2          6/2010
(Continued)

OTHER PUBLICATIONS

International Search Report issued in corresponding International Application No. PCT/JP2017/026077, dated Sep. 19, 2017, with translation (2 pages).
(Continued)

*Primary Examiner* — Roger L Pang
(74) *Attorney, Agent, or Firm* — Osha Liang LLP (57) ABSTRACT

A variable-speed speed-up mechanism includes: an electric device which is configured to generate a rotational driving force and a planetary gear transmission device which is configured to change the speed of the rotational driving force transmitted from the electric device to a constant-speed input shaft and a variable-speed input shaft and transmit the rotational driving force to a target to be driven via an output shaft. The electric device includes a constant-speed electric motor including a constant-speed rotor which
(Continued)

is configured to rotate the constant-speed input shaft of the planetary gear transmission device and a variable-speed electric motor including a variable-speed rotor which is configured to rotate the variable-speed input shaft of the planetary gear transmission device.

8 Claims, 8 Drawing Sheets

(51) Int. Cl.
*H02K 7/108* (2006.01)
*H02K 7/116* (2006.01)
*H02K 9/06* (2006.01)

(52) U.S. Cl.
CPC .............. *H02K 9/06* (2013.01); *F16H 3/727* (2013.01); *F16H 3/728* (2013.01); *F16H 61/12* (2013.01); *F16H 2061/124* (2013.01); *F16H 2061/1232* (2013.01); *F16H 2061/1296* (2013.01); *Y10T 477/32* (2015.01)

(58) Field of Classification Search
CPC ....... F16H 2061/1232; F16H 2061/124; F16H 2061/2061; F16H 2061/1296; H02K 7/116; H02K 7/108

USPC ......................................................... 475/153
See application file for complete search history.

(56) References Cited

U.S. PATENT DOCUMENTS

2017/0155345 A1* 6/2017 Kobayashi ............. H02K 7/116
2018/0126836 A1* 5/2018 Waldner .................. F03D 15/00
2019/0186600 A1* 6/2019 Miyata ...................... F16H 3/72

FOREIGN PATENT DOCUMENTS

JP         2010-242811 A     10/2010
WO    WO-2006092911 A1 *  9/2006    ............. B29B 7/183

OTHER PUBLICATIONS

Written Opinion issued in corresponding International Application No. PCT/JP2017/026077, dated Sep. 19, 2017, with translation (7 pages).

* cited by examiner

VARIABLE-SPEED SPEED-UP MECHANISM

TECHNICAL FIELD

The present invention relates to a variable-speed speed-up mechanism, including: an electric device including a constant-speed electric motor and a variable-speed electric motor; and a planetary gear transmission device which changes a rotation driving force generated by the electric device and transmits a target to be driven.

BACKGROUND ART

As a device which drives a rotary machine, such as a compressor, there are an electric device which generates a rotation driving force and a transmission device which changes the speed of the rotation driving force generated by the electric device and transmits the rotation driving force to the rotary machine.

Patent Document 1 describes that a constant-speed electric motor and a variable-speed electric motor for speed change are used as the electric device and a planetary gear transmission device is used as the transmission device in order to accurately control a gear ratio. In the device, by changing the rotational speed of the variable-speed electric motor, it is possible to change the rotational speed of an output shaft of the planetary gear transmission device connected to the rotary machine.

CITATION LIST

Patent Literature

[Patent Document 1] Japanese Patent No. 4472350

SUMMARY OF INVENTION

Technical Problem

In the variable-speed speed-up mechanism, for example, the electric device may trip (stop) due to overvoltage, overcurrent, or the like. In the case, both the constant-speed electric motor and the variable-speed electric motor are stopped. At this time, there is a possibility that the variable-speed electric motor connected to the constant-speed electric motor through the transmission device may excessively rotate due to the rotational speed of the constant-speed electric motor and the inertia of the compressor.

An object of the present invention is to provide a variable-speed speed-up mechanism including: an electric device including a constant-speed electric motor and a variable-speed electric motor; and a planetary gear transmission device which changes the speed of the rotational driving force generated by the electric device and transmits the rotational driving force to a target to be driven, in which it is possible to stop the variable-speed electric motor without excessive rotation.

Solution to Problem

According to a first aspect of the present invention, there is provided a variable-speed speed-up mechanism including: an electric device which is configured to generate a rotational driving force; and a planetary gear transmission device which is configured to change the speed of the rotational driving force transmitted from the electric device to a constant-speed input shaft and a variable-speed input shaft and transmit the rotational driving force to a target to be driven via an output shaft, in which the electric device includes a constant-speed electric motor including a constant-speed rotor which is configured to rotate the constant-speed input shaft of the planetary gear transmission device, and a variable-speed electric motor including a variable-speed rotor which is configured to rotate the variable-speed input shaft of the planetary gear transmission device, and in which the variable-speed speed-up mechanism further includes a clutch device including at least one of the group consisting of a constant-speed clutch for transmitting or blocking the rotation of the constant-speed rotor to the constant-speed input shaft and a variable-speed clutch for transmitting or blocking the rotation of the variable-speed rotor to the variable-speed input shaft, and a control device which is configured to block the rotation of at least one of the constant-speed rotor and the variable-speed rotor by using the clutch device in a case where the variable-speed electric motor trips.

According to the configuration, in a case where at least one of the constant-speed electric motor and the variable-speed electric motor configuring the electric device trips, by blocking the rotation of the constant-speed rotor by using the clutch device, it is possible to prevent the variable-speed electric motor from excessively rotating.

In the variable-speed speed-up mechanism, the control device may perform control to lower the rotational speed of the variable-speed electric motor in a case where only the constant-speed electric motor trips.

According to the configuration, in a case where only the constant-speed electric motor trips, without performing the control of the clutch device, it is possible to stop the variable-speed speed-up mechanism only by controlling the variable-speed electric motor.

In the variable-speed speed-up mechanism, the planetary gear transmission device may include a sun gear which is configured to rotate around an axis line, a sun gear shaft which is fixed to the sun gear and extends in an axial direction around the axis line, a planetary gear which is configured to mesh with the sun gear and revolves around the axis line and to rotate around a center line thereof, a gear of which a plurality of teeth are arranged in an annular shape around the axis line, and which is configured to mesh with the planetary gears, a planetary gear carrier which has a planetary gear carrier shaft that extends in the axial direction around the axis line and supports the planetary gear to be capable of revolving around the axis line and to be rotatable around the center line of the planetary gear itself, and a gear carrier which has a gear carrier shaft that extends in the axial direction around the axis line and supports the gear to be rotatable around the axis line, the sun gear shaft may form the output shaft connected to the target to be driven, the gear carrier shaft may form a constant-speed input shaft, and the planetary gear carrier shaft may form the variable-speed input shaft, the variable-speed rotor and the planetary gear carrier shaft may be formed in a cylindrical shape around the axis line, and shaft insertion holes may be formed penetrating in the axial direction, and the constant-speed rotor may be inserted into the shaft insertion holes.

In the variable-speed speed-up mechanism, the gear may be an internal gear, and the gear carrier shaft may be an internal gear carrier shaft.

In the variable-speed speed-up mechanism, the gear may be an external gear, the gear carrier shaft may be an external gear carrier shaft, the planetary gear may include a primary gear which meshes with the external gear and a secondary gear which meshes with the sun gear, and the planetary gear carrier coaxially may support the primary gear and the secondary gear.

Advantageous Effects of Invention

According to the present invention, in a case where at least one of the constant-speed electric motor and the variable-speed electric motor configuring the electric device trips, by blocking the rotation of the constant-speed rotor by using the clutch device, it is possible to prevent the variable-speed electric motor from excessively rotating.

DESCRIPTION OF EMBODIMENTS

First Embodiment

Hereinafter, a variable-speed speed-up mechanism of an embodiment of the present invention will be described in detail with reference to the drawings.

Figure 1:
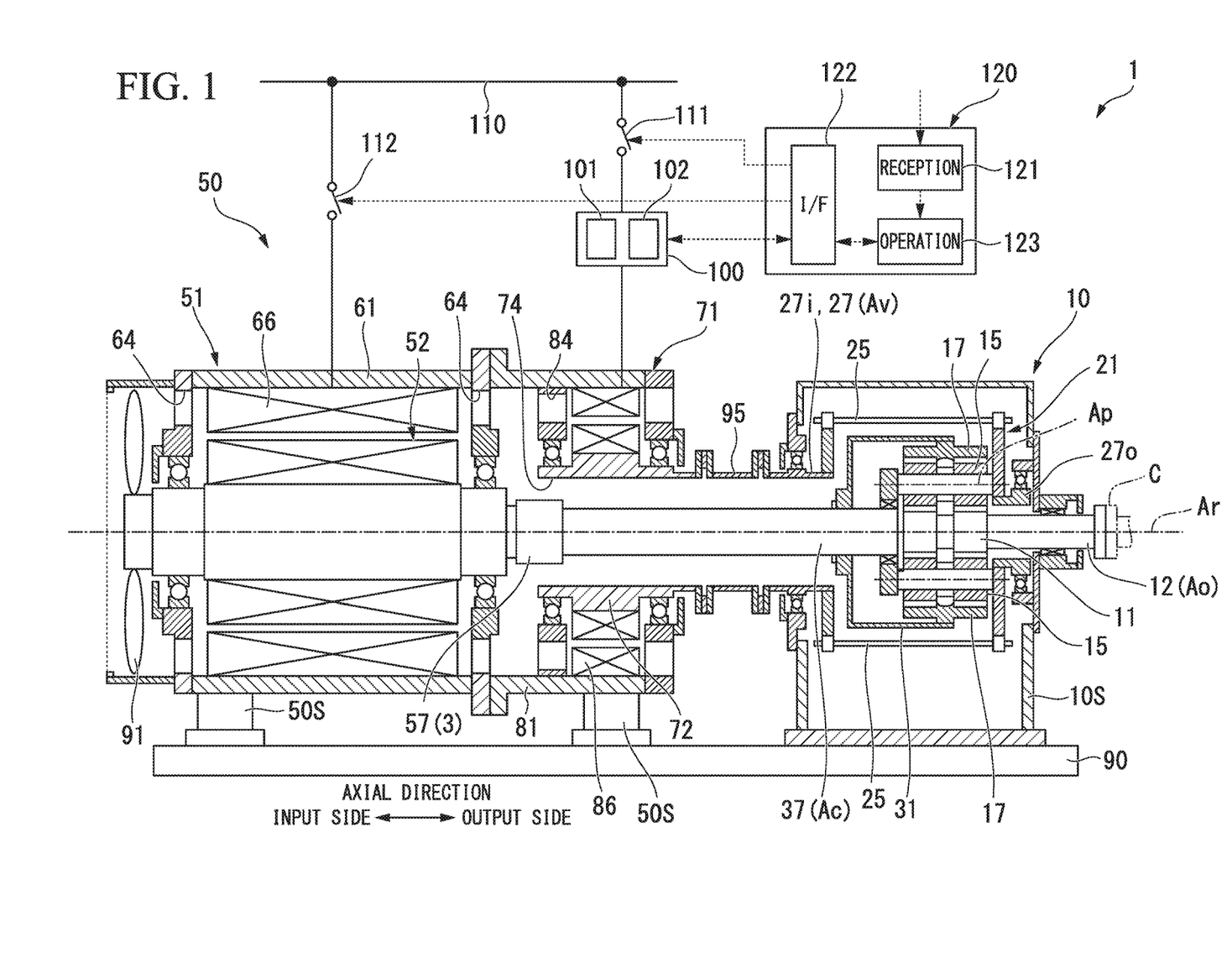
FIG. 1 is a sectional view of a variable-speed speed-up mechanism of a first embodiment according to the present invention.

As illustrated in FIG. 1, a variable-speed speed-up mechanism 1 of the embodiment includes an electric device 50 which generates a rotation driving force, and a transmission device 10 which changes the speed of the rotation driving force generated by the electric device 50 and transmits the rotation driving force to a target to be driven. The variable-speed speed-up mechanism 1 can be employed in, for example, a fluid mechanical system, such as a compressor system.

The target to be driven of the variable-speed speed-up mechanism 1 of the present embodiment is a compressor C.

The gear transmission device 10 is a planetary gear transmission device.

The electric device 50 includes a constant-speed electric motor 51 having a constant-speed rotor 52 which rotates at a constant-speed, and a variable-speed electric motor 71 having a variable-speed rotor 72 which rotates at any rotational speed. The constant-speed rotor 52 and the variable-speed rotor 72 are each connected to the transmission device 10.

Further, the variable-speed speed-up mechanism 1 is provided with a clutch device 3 which transmits or blocks the rotation of the electric device 50 to the transmission device 10. In other words, the variable-speed speed-up mechanism 1 can separate the transmission device 10 and the electric device 50 from each other.

The clutch device 3 of the present embodiment is a constant-speed clutch 57 which transmits or blocks the rotation of the constant-speed electric motor 51 to the internal gear carrier shaft 37 which is a constant-speed input shaft Ac.

The electric device 50 is supported by a frame 90 by an electric device support unit 50S. The gear transmission device 10 is supported by the frame 90 by a transmission device support unit 10S. By the support units, it is possible to reliably fix the electric device 50 and the gear transmission device 10, which are heavy objects.

Figure 2:
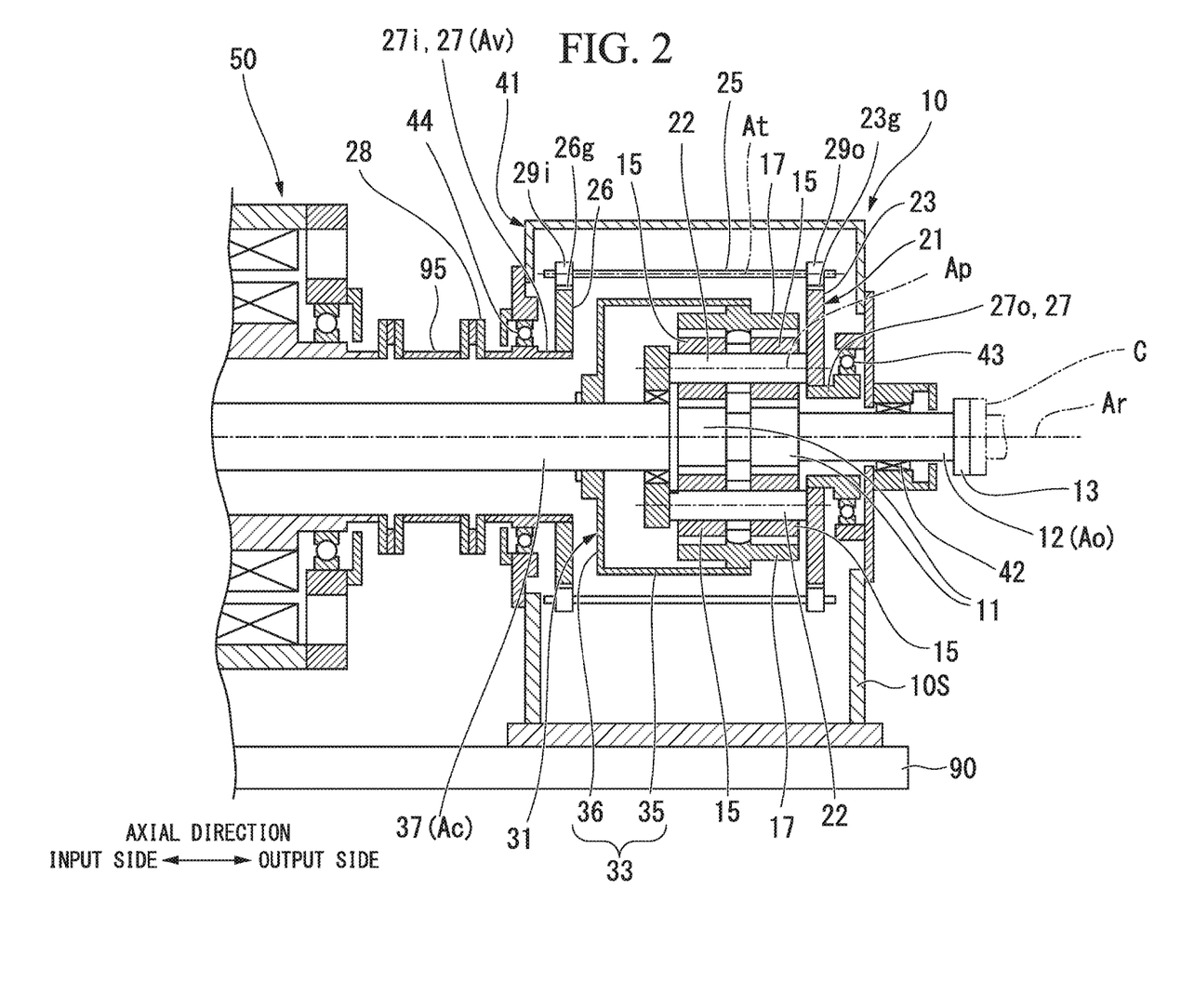
FIG. 2 is a sectional view of a transmission device of the first embodiment according to the present invention.

As shown in FIG. 2, the transmission device 10 includes a sun gear 11 which rotates around an axis line Ar that extends in a horizontal direction, a sun gear shaft 12 which is fixed to the sun gear 11, a plurality of planetary gears 15 which mesh with the sun gear 11, revolve around the axis line Ar, and rotate around a center line Ap thereof, an internal gear (gear) 17 of which a plurality of teeth are arranged in an annular shape around the axis line Ar, and which meshes with the plurality of planetary gears 15, a planetary gear carrier 21 which supports the plurality of planetary gears 15 to be capable of revolving around the axis line Ar and to be rotatable around a center line Ap of the planetary gear 15 itself, an internal gear carrier (gear carrier) 31 which supports the internal gear 17 to be rotatable around the axis line Ar, and a transmission device casing 41 which covers the members.

Hereinafter, a direction in which the axis line Ar extends is an axial direction, one side in the axial direction is an output side, and the side opposite to the output side is an input side. In addition, a radial direction around the axis line Ar is simply referred to as a radial direction. In the variable-speed speed-up mechanism 1 of the present embodiment, the electric device 50 is disposed on the input side in the axial direction in the variable-speed speed-up mechanism 1, and the gear transmission device 10 is disposed on the output side with respect to the electric device 50. The compressor C is disposed on the output side with respect to the variable-speed speed-up mechanism 1.

The sun gear shaft 12 forms a columnar shape around the axis line Ar, and extends from the sun gear 11 to the output side in the axial direction. A flange 13 is formed in an output side end portion of the sun gear shaft 12. For example, a rotor of the compressor C that serves as a target to be driven is connected to the flange 13. The sun gear shaft 12 is supported by a sun gear bearing 42 disposed on the output side with respect to the sun gear 11 so as to be rotatable around the axis line Ar. The sun gear bearing 42 is attached to the transmission device casing 41.

The planetary gear carrier 21 includes a planetary gear shaft 22 provided for each of the plurality of planetary gears 15, a planetary gear carrier main body 23 for fixing positions of the plurality of planetary gear shafts 22 with each other, and an output side planetary gear carrier shaft 27o which extends in the axial direction around the axis line Ar. The output side planetary gear carrier shaft 27o is fixed to inner side in the radial direction of the planetary gear carrier main body 23.

The planetary gear shaft 22 penetrates the center line Ap of the planetary gear 15 in the axial direction and supports the planetary gear 15 so as to be rotatable around the center line thereof. The planetary gear carrier main body 23 extends radially outward from the plurality of planetary gear shafts 22.

The output side planetary gear carrier shaft 27o extends outward from the planetary gear carrier main body 23. The output side planetary gear carrier shaft 27o forms a cylindrical shape around the axis line Ar.

The output side planetary gear carrier shaft 27o is supported by a planetary gear carrier bearing 43 so as to be rotatable around the axis line Ar. The planetary gear carrier bearing 43 is attached to the transmission device casing 41. The sun gear shaft 12 is inserted into an inner circumferential side of the output side planetary gear carrier shaft 27o.

The transmission device 10 includes an input side planetary gear carrier shaft 27i connected to the variable-speed rotor 72 of the variable-speed electric motor 71, and a transmission device shaft 25 which transmits the rotation of the input side planetary gear carrier shaft 27i to the planetary gear carrier 21.

The input side planetary gear carrier shaft 27i forms a cylindrical shape around the axis line Ar. The input side planetary gear carrier shaft 27i is disposed on the input side of the transmission device 10, and is supported by a planetary gear carrier bearing 44 so as to be rotatable around the axis line Ar. The planetary gear carrier bearing 44 is attached to the transmission device casing 41. An internal gear carrier shaft (gear carrier shaft) 37 for driving the internal gear carrier 31 of the transmission device 10 is inserted into the inner circumferential side of the input side planetary gear carrier shaft 27i.

An annular flange 28 which widens radially outward is formed at an input side end of the input side planetary gear carrier shaft 27i. An input side arm portion 26 which extends radially outward is formed at an output side end of the input side planetary gear carrier shaft 27i.

The transmission device shaft 25 is supported so as to be rotatable around an axis line At. The transmission device shaft 25 is attached to the transmission device casing 41 via a bearing (not shown). At both ends of the transmission device shaft 25, an input side transmission device gear 29i and an output side transmission device gear 29o are fixed.

The input side transmission device gear 29i meshes with a driving gear 26g formed at an outer circumference of the input side arm portion 26. The output side transmission device gear 29o meshes with a gear 23g formed at the outer circumference of the planetary gear carrier main body 23. Accordingly, the rotation of the input side planetary gear carrier shaft 27i is transmitted to the planetary gear carrier 21 via the transmission device shaft 25.

The internal gear carrier 31 includes a carrier main body 33 to which the internal gear 17 is fixed, and an internal gear carrier shaft 37 which is fixed to the carrier main body 33 and extends in the axial direction around the axis line Ar.

The carrier main body 33 includes a cylinder portion 35 which forms a cylindrical shape around the axis line Ar and has the internal gear 17 fixed to the inner circumferential side thereof, and an input side arm portion 36 which extends radially inward from the input side end of the cylinder portion 35.

The internal gear carrier shaft 37 having a columnar shape around the axis line Ar is disposed on the input side with respect to the sun gear shaft 12 having a columnar shape around the axis line Ar. The input side arm portion 36 of the carrier main body 33 is fixed to the internal gear carrier shaft 37. The internal gear carrier shaft 37 is inserted into the inner circumferential side of the cylindrical input side planetary gear carrier shaft 27i.

Figure 3:
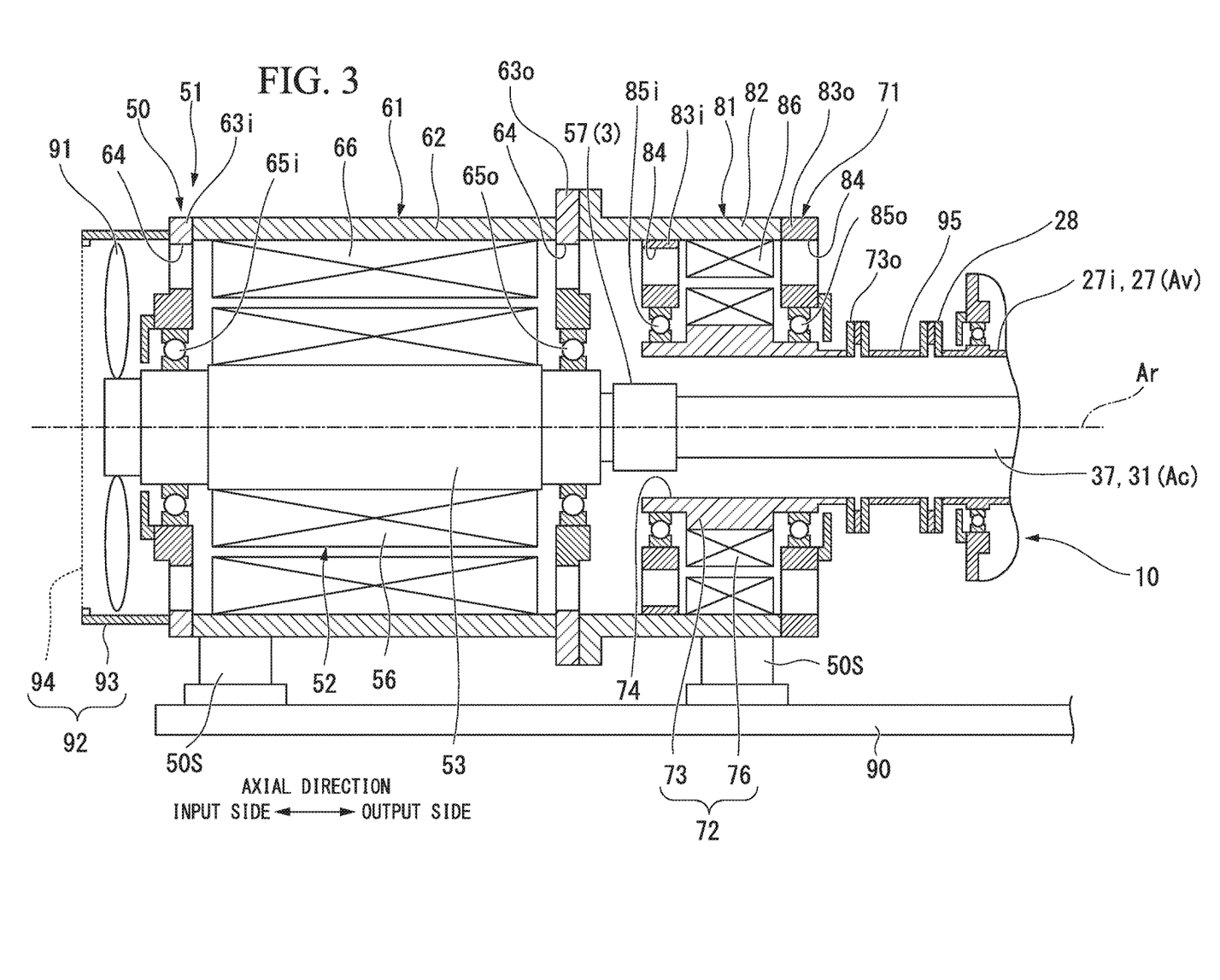
FIG. 3 is a sectional view of an electric device of the first embodiment according to the present invention.

As shown in FIG. 3, the constant-speed electric motor 51 rotates and drives the internal gear carrier shaft 37 of the gear transmission device 10. The variable-speed electric motor 71 rotates and drives the input side planetary gear carrier shaft 27i of the gear transmission device 10. The electric device 50 includes a cooling fan 91 for cooling the constant-speed electric motor 51 and a fan cover 92 which covers the cooling fan 91.

The internal gear carrier shaft 37 is a constant-speed input shaft Ac which rotates at a constant-speed by a driving force of the constant-speed electric motor 51. The input side planetary gear carrier shaft 27i is a variable-speed input shaft Av which rotates at any rotational speed by a driving force of the variable-speed electric motor 71.

In the variable-speed speed-up mechanism 1, by changing the rotational speed of the variable-speed electric motor 71, it is possible to change the rotational speed of an output shaft Ao of the gear transmission device 10 connected to the target to be driven.

In the present embodiment, the constant-speed electric motor 51 is, for example, a four-pole three-phase induction electric motor. In addition, the variable-speed electric motor 71 is an eight-pole three-phase induction electric motor having more poles than the constant-speed electric motor 51. In addition, the specifications of the constant-speed electric motor 51 and the variable-speed electric motor 71 are not limited thereto, and specifications can be appropriately changed.

The constant-speed electric motor 51 includes a constant-speed rotor 52 which rotates around the axis line Ar and is connected to the internal gear carrier shaft 37 which is the constant-speed input shaft Ac of the transmission device 10 via the constant-speed clutch 57, a constant-speed stator 66 which is disposed on the outer circumferential side of the constant-speed rotor 52, and a constant-speed electric motor casing 61 in which the constant-speed stator 66 is fixed to the inner circumferential side.

The constant-speed rotor 52 includes a constant-speed rotor shaft 53 which forms a columnar shape around the axis Ar, and a conductor 56 which is fixed to the outer circumference of the constant-speed rotor shaft 53. The cooling fan 91 is fixed to the input side end of the constant-speed rotor shaft 53.

The constant-speed stator 66 is disposed on the radial outside of the conductor 56 of the constant-speed rotor 52. The constant-speed stator 66 is formed of a plurality of coils.

The constant-speed electric motor casing 61 includes a casing main body 62 having a cylindrical shape around the axis line Ar and having a constant-speed stator 66 fixed to the inner circumferential side thereof, and lids 63i and 63o which blocks both ends of the cylindrical casing main body 62 in the axial direction. Constant-speed rotor bearings 65i and 65o which rotatably support the constant-speed rotor shaft 53 around the axis line Ar are attached to each of the lids 63i and 63o. A plurality of openings 64 which penetrate in the axial direction are formed in each of the lids 63i and 63o at positions further on the radial outside than the constant-speed rotor bearing 65i.

The input side end of the constant-speed rotor shaft 53 protrudes to the input side from the lid 63i on the input side of the constant-speed electric motor casing 61. The cooling fan 91 is fixed to the input side end of the constant-speed rotor shaft 53.

When the constant-speed rotor 52 rotates, the cooling fan 91 also rotates integrally with the constant-speed rotor 52. The fan cover 92 includes a cylindrical cover main body 93 which is disposed on the outer circumferential side of the cooling fan 91, and an air-circulating plate 94 which is attached to the opening on an inlet side of the cover body 93 and which has a plurality of air holes formed therein. The fan cover 92 is fixed to the lid 63i on the input side of the constant-speed electric motor casing 61.

The constant-speed clutch 57 is a device which transmits or blocks the rotation transmitted from the constant-speed rotor 52 (constant-speed rotor shaft 53) to the internal gear carrier shaft 37 which is the constant-speed input shaft Ac. As the constant-speed clutch 57, not only a mechanical type but also a system using an electromagnetic force can be adopted without a limit as long as the clutch is used between two power transmission device shafts.

The variable-speed electric motor 71 includes a variable-speed rotor 72 which rotates around the axis line Ar and is connected to the input side planetary gear carrier shaft 27i which is the variable-speed input shaft Av, a variable speed stator 86 which is disposed on the outer circumferential side of the variable-speed rotor 72, and a variable-speed electric motor casing 81 to which the variable speed stator 86 is fixed on the inner peripheral side.

The variable-speed rotor 72 includes a variable-speed rotor shaft 73 and a conductor 76 which is fixed to the outer circumference of the variable-speed rotor shaft 73. The variable-speed rotor shaft 73 has a cylindrical shape around the axis line Ar and has a shaft insertion hole 74 which penetrates in the axial direction. The internal gear carrier shaft 37 which is the constant-speed input shaft Ac is inserted into the shaft insertion hole 74 of the variable-speed rotor shaft 73. An annular flange 73o which widens radially outward is formed at the output side end of the variable-speed rotor shaft 73.

The variable speed stator 86 is disposed on the radial outside of the conductor 76 of the variable-speed rotor 72. The variable speed stator 86 is formed of a plurality of coils.

The variable-speed electric motor casing 81 includes a casing main body 82 having a cylindrical shape around the axis line Ar and having the variable speed stator 86 fixed to the inner circumferential side thereof, an output side lid 83o which blocks the output side end of the cylindrical casing main body 82, and an inlet side lid 83i which is disposed further on the input side than the variable speed stator 86 and is fixed to the inner circumferential side of the cylindrical casing main body 82. Variable-speed rotor bearings 85i and 85o which rotatably support the variable-speed rotor shaft 73 around the axis line Ar are attached to each of the lids 83i and 83o. A plurality of openings 84 which penetrate in the axial direction are formed in each of the lids 83i and 83o at positions further on the radial outside than the variable-speed rotor bearings 85i and 85o.

By the plurality of openings 84 being formed in the each of lids 83i and 83o of the variable-speed electric motor casing 81 and the plurality of openings 64 being formed in each of the lids 63i and 63o of the constant-speed electric motor casing 61, a space in the variable-speed electric motor casing 81 and a space in the constant-speed electric motor casing 61 communicate with each other.

The variable-speed speed-up mechanism 1 of the present embodiment includes a variable-speed flexible coupling 95 which is disposed between the input side planetary gear carrier shaft 27i which is the variable-speed input shaft Av, and the variable-speed rotor 72, and connects the input side planetary gear carrier shaft 27i and the variable-speed rotor 72 to each other.

In addition, in the variable-speed speed-up mechanism 1 of the present embodiment, the constant-speed rotor 52, the variable-speed rotor 72, and the sun gear shaft 12 are arranged on the same axis line Ar.

Figure 4:
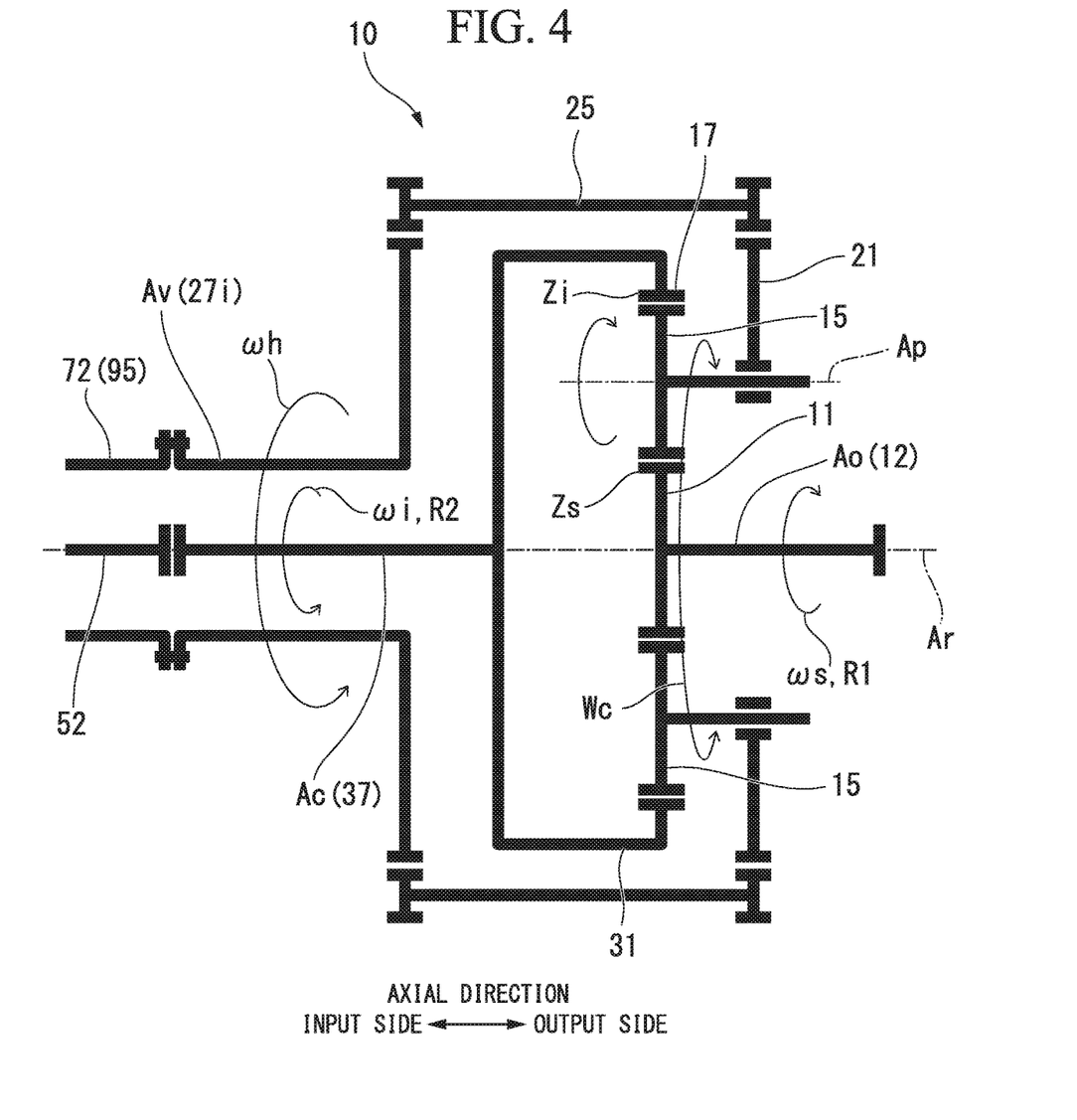
FIG. 4 is a schematic view showing a configuration of the transmission device of the first embodiment according to the present invention.

As shown in FIG. 4, the constant-speed electric motor 51 is set so as to rotate the constant-speed rotor 52 (internal gear 17) in a second direction R2 in the circumferential direction of the axis line Ar by supplying electric power to the constant-speed electric motor 51. As the constant-speed rotor 52 rotates in the second direction R2, the internal gear carrier shaft 37 and the internal gear carrier 31 rotate in the second direction R2.

The output shaft Ao of the transmission device 10 is provided so as to rotate in the first direction R1 reverse to the second direction R2 as the constant-speed rotor 52 of the constant-speed electric motor 51 rotates at the maximum rotational speed in the second direction R2. In other words, the forward rotation of the constant-speed electric motor 51 is performed in the second direction R2, and the forward rotation of the output shaft Ao of the transmission device 10 is performed in the first direction R1. The compressor C operates normally as the output shaft Ao rotates forward.

In addition, in the following description, the rotational direction in the first direction R1 is defined as a positive rotation direction, and the rotational direction in the second direction R2 is defined as a negative rotation direction. For example, the maximum rotational speed of the constant-speed electric motor 51 is −1800 rpm.

The transmission device 10 is configured such that the planetary gear carrier 21 rotates in the first direction R1 as the variable-speed rotor 72 rotates in the first direction R1.

The variable-speed electric motor 71 can rotate and drive the variable-speed rotor 72 (planetary gear carrier 21) in the first direction R1 and in the second direction R2 in the circumferential direction of the axis line Ar. In other words, the variable-speed electric motor 71 is capable of rotating forward and reversely. By increasing the rotational speed of the variable-speed rotor 72 in the first direction R1, the rotational speed of the output shaft Ao of the transmission device 10 in the first direction R1 increases. By rotating the variable-speed rotor 72 at the maximum rotational speed in the first direction R1, the output shaft Ao rotates at the maximum rotational speed.

The variable-speed electric motor 71 functions as a generator by rotating the variable-speed rotor 72 by an external force. A state where the variable-speed electric motor 71 functions as a generator is referred to as a generator mode. The variable-speed electric motor 71 functions as an electric motor when electric power is supplied. A state where the variable-speed electric motor 71 functions as the electric motor is referred to as an electric motor mode.

The variable-speed speed-up mechanism 1 of the present embodiment includes: a rotational speed control device 100 (inverter) which controls the rotational speed of the variable-speed electric motor 71; a variable-speed electric motor switch 111 which sets the variable-speed electric motor 71 in a power supply state and in a power cut state; a constant-speed electric motor switch 112 which sets the constant-speed electric motor 51 in a power supply state and in a power cut state; and a control unit 120 which controls operations of the rotational speed control device 100, the variable-speed electric motor switch 111, and the constant-speed electric motor switch 112.

The control unit 120 is configured with a computer. The control unit 120 includes: an reception unit 121 which directly receives an instruction from an operator or receives an instruction from a host control device; an interface 122 which gives the instruction to the variable-speed electric motor switch 111, the rotational speed control device 100, and the constant-speed electric motor switch 112; and an operation unit 123 which prepares a command value ωh' (frequency) to the variable-speed electric motor switch 111, the constant-speed electric motor switch 112, and the rotational speed control device 100 in accordance with the instruction or the like received by the reception unit 121.

The variable-speed electric motor switch 111 is electrically connected to a power source line 110 and the rotational number control device 100. The rotational speed control device 100 is electrically connected to the variable-speed electric motor 71. The constant-speed electric motor switch 112 is electrically connected to the power source line 110 and the constant-speed electric motor 51.

The variable-speed electric motor switch 111 is turned on by an ON instruction from the control unit 120, and is turned off by an OFF instruction from the control unit 120. When the variable-speed electric motor switch 111 is turned on, the electric power from the power source line 110 is supplied to the variable-speed electric motor 71 via the rotational speed control device 100, and the variable-speed electric motor 71 is placed in the power supply state. When the variable-speed electric motor switch 111 is turned on, the electric power from the power source line 110 is supplied to the rotational speed control device 100 and the variable-speed electric motor 71, and the variable-speed electric motor 71 is placed in the power cut state.

The constant-speed electric motor switch 112 is turned on by an ON instruction from the control unit 120, and is turned off by an OFF instruction from the control unit 120. When the constant-speed electric motor switch 112 is turned on, the electric power from the power source line 110 is supplied to the constant-speed electric motor 51, and the constant-speed electric motor 51 is placed in the power supply state. When the constant-speed electric motor switch 112 is turned off, the electric power from the power source line 110 is supplied to the constant-speed electric motor 51, and the constant-speed electric motor 51 is placed in the power cut state.

The rotational speed control device 100 includes a frequency conversion unit 101 which changes the frequency of electric power supplied from the power source line 110, and a rotational direction-changing unit 102 which changes the rotational direction of the variable-speed electric motor 71.

The frequency conversion unit 101 supplies the power of the frequency that corresponds to the command value ωh' of the rotational speed of the variable-speed electric motor 71, which is instructed from the control unit 120. The variable-speed rotor 72 of the variable-speed electric motor 71 rotates at a rotational speed that corresponds to the frequency. In this manner, since the rotational speed of the variable-speed rotor 72 changes, the rotational speed of the planetary gear carrier 21 of the transmission device 10 connected to the variable-speed rotor 72 also changes. As a result, the rotational speed of the sun gear shaft 12 which is the output shaft Ao of the transmission device 10 also changes.

The rotational direction-changing unit 102 is a device which changes the rotational direction of the variable-speed electric motor 71 by using a circuit for switching a plurality of (three in the case of the present embodiment) power source lines connected to the variable-speed electric motor 71. In other words, the rotational direction-changing unit 102 can rotate the variable-speed rotor 72 forward and reverse.

Here, the relationship between the number of teeth of each gear of the transmission device 10 and the rotational speed of each shaft of the transmission device 10 will be described with reference to FIG. 4.

The rotational speed of the sun gear shaft 12 that serves as the output shaft Ao is ωS, the rotational speed of the internal gear carrier shaft 37 (constant-speed electric motor 51) that serves as the constant-speed input shaft Ac is ρi, and the rotational speed of the input side planetary gear carrier shaft 27i (variable-speed electric motor 71) that serves as the variable-speed input shaft Av is ωh. In addition, the number of teeth of the sun gear 11 is ZS, and the number of teeth of the internal gear 17 is Zi.

In addition, a ratio ωS/ωi of the rotational speed ωS of the output shaft Ao to the rotational speed ωi of the constant-speed electric motor 51 is U. The ratio U of the rotational speed ωs of the output shaft Ao to the rotational speed ωi of the constant-speed electric motor 51 is the same as a ratio Zi/ZS of the number of teeth Zi of the internal gear 17 to the number of teeth ZS of the sun gear 11.

In addition, a ratio ωc/ωh of the rotational speed ωc of the planetary gear carrier 21 to the rotational speed ωh of the variable-speed electric motor 71 is P.

The relationship between the number of teeth of each of the gears and the rotational speed of each of the shafts of the transmission device 10 can be expressed by the following expression (1).

$$\omega S/\omega i = P \times \omega h/\omega i - (1 - P \times \omega h/\omega i) \times U \quad (1)$$

In a case where the constant-speed electric motor 51 is a four-pole induction electric motor and the power supply frequency is 60 Hz, the rotational speed ωi (rated rotational speed) of the constant-speed rotor 52 (constant-speed input shaft Ac) is 1800 rpm. In addition, in a case where the variable-speed electric motor 71 is an eight-pole induction electric motor and the power supply frequency is 60 Hz, the highest rotational speed ωh (rated rotational speed) of the variable-speed rotor 72 (variable-speed input shaft Av) is 900 rpm.

In addition, the ratio U of the rotational speed ωs of the output shaft Ao to the rotational speed ωi of the constant-speed electric motor 51 (the ratio Zi/ZS of the number of teeth ZS of the sun gear 11 to the number of teeth ZS the internal gear 17) is 4.

In addition, the ratio P of the rotational speed ωc of the planetary gear carrier 21 to the rotational speed ωh of the variable-speed electric motor 71 is 0.3.

In this case, when the direction of rotation of the constant-speed rotor 52 (internal gear 17) is defined as rotation in the second direction R2 (−1800 rpm) and the direction of rotation of the variable-speed rotor 72 (planetary gear carrier 21) is defined as the highest rotational speed (900 rpm) in a direction (rotation in the first direction R1) reverse to the rotation of the constant-speed rotor 52, the rotational speed ωS of the sun gear shaft 12 which is the output shaft Ao is 8550 rpm. The rotational speed (8550 rpm) is the highest rotational speed of the sun gear shaft 12.

In other words, in the transmission device 10 of the present embodiment, the internal gear 17 that corresponds to the constant-speed input shaft Ac rotates at 1800 rpm and the planetary gear carrier 21 that corresponds to the variable-speed input shaft Av rotates at 900 rpm, and accordingly, the rotational speed ωS of the output shaft Ao becomes the highest rotational speed.

When assuming that the variable speed range of the variable-speed input shaft Av is from −900 rpm to +900 rpm, as the rotational speed of the variable-speed input shaft Av approaches −900 rpm, the rotational speed ωs of the output shaft Ao gradually decreases.

The control unit 120 of the variable-speed speed-up mechanism 1 of the present embodiment has a function of preventing excessive rotation of the variable-speed electric motor 71 in a case where at least one of the constant-speed electric motor 51 and the variable-speed electric motor 71 trips.

Figure 5:
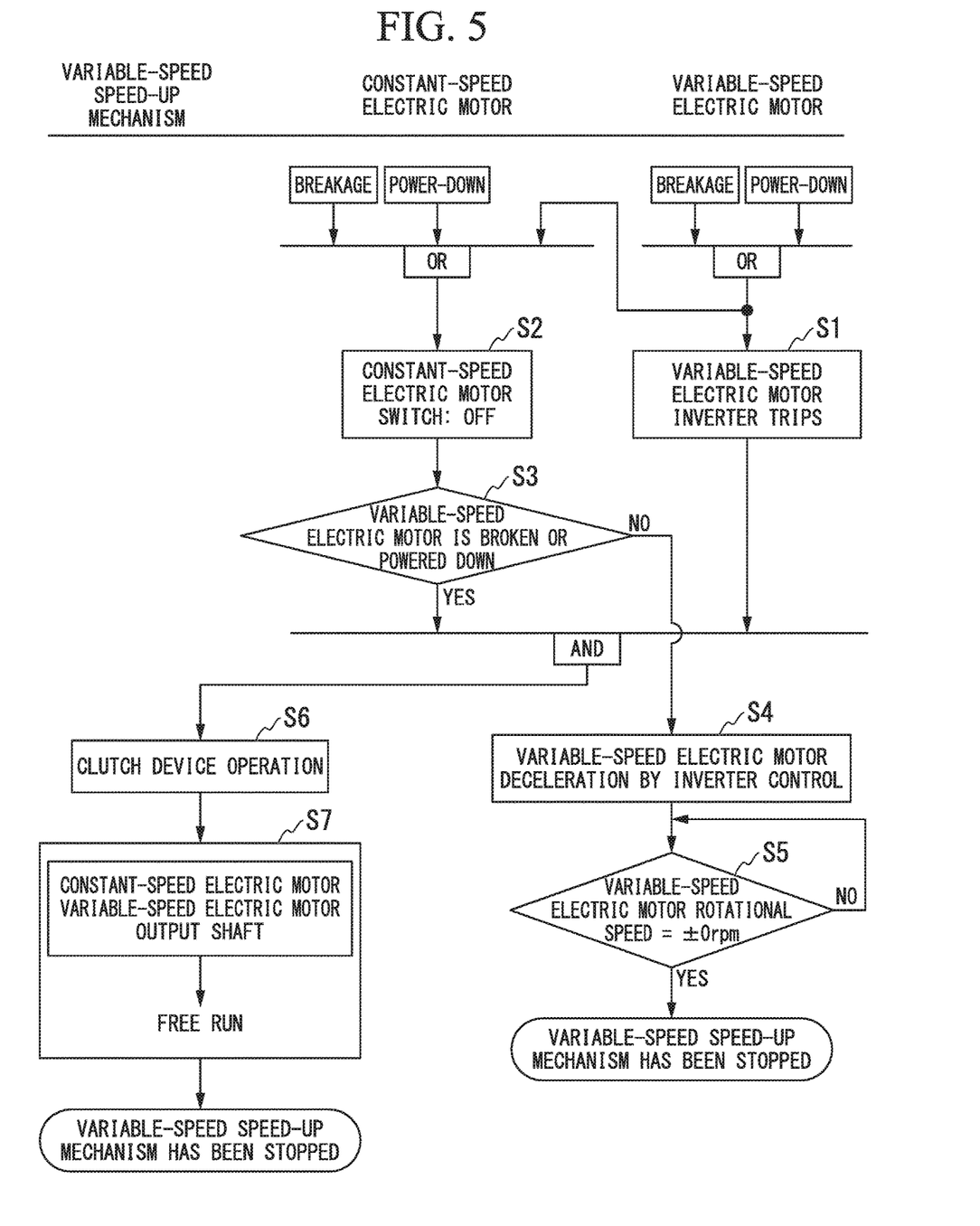
FIG. 5 is a flowchart describing a variable-speed speed-up mechanism stopping method regarding the variable-speed speed-up mechanism according to the first embodiment of the present invention.

The control unit 120 of the variable-speed speed-up mechanism 1 according to the present embodiment executes a variable-speed speed-up mechanism stopping method as shown in FIG. 5 in a case where the electric device 50 trips.

(1) In a Case where the Constant-Speed Electric Motor Trips.

The control unit 120 constantly monitors the state of the electric device 50.

As shown in FIG. 5, in a case where the constant-speed electric motor 51 trips due to failure, power outage or the like, the control unit 120 of the variable-speed speed-up mechanism 1 of the present embodiment does not operate the clutch device 3, and executes a constant-speed electric motor stopping step S2, a variable-speed electric motor state determining step S3, a variable-speed electric motor decelerating step S4, and a variable-speed electric motor rotational speed determining step S5.

In the constant-speed electric motor stopping step S2, the control unit 120 turns off the constant-speed electric motor switch 112 and places the constant-speed electric motor 51 to be in the power cut state.

In the variable-speed electric motor state determining step S3, the control unit 120 determines whether or not the variable-speed electric motor 71 is tripping (whether the variable-speed electric motor 71 is broken or powered down). In a case where the variable-speed electric motor 71 is not tripped, that is, in a case where the variable-speed electric motor 71 can be controlled, the variable-speed electric motor decelerating step S4 is executed.

In the variable-speed electric motor decelerating step S4, the control unit 120 reduces the rotational speed of the variable-speed electric motor 71 by controlling the rotational speed control device 100 (inverter). In other words, the variable-speed rotor 72 is decelerated. Here, when the deceleration speed is slow, there is a possibility that the constant-speed rotor 52 or the output shaft Ao is reversely rotated, and thus, the rotational speed of the variable-speed electric motor 71 is faster than the rotational speed at which the constant-speed electric motor 51 and the output shaft Ao reaches 0 rpm, and it is necessary to reduce the rotational speed to 0 rpm.

In variable-speed electric motor rotational speed determining step S5, the control unit 120 determines whether or not the rotational speed of the variable-speed electric motor 71 is reduced to 0 rpm. In a case where the rotational speed of the variable-speed electric motor 71 has not decreased to 0 rpm, the deceleration is continued.

At the time when the rotational speed of the variable-speed electric motor 71 decreases to 0 rpm, the stop of the variable-speed speed-up mechanism 1 is completed.

According to the above-described variable-speed speed-up mechanism stopping method, the constant-speed electric motor 51 freely runs (rotates with inertia), the rotational speed of the variable-speed electric motor 71 decreases under control, and accordingly, it is possible to stop the variable-speed speed-up mechanism 1.

In other words, in a case where only the constant-speed electric motor 51 trips, without performing the control of the clutch device 3, it is possible to stop the variable-speed speed-up mechanism 1 only by controlling the variable-speed electric motor 71.

(2) In a Case where the Variable-Speed Electric Motor Trips.

The control unit 120 constantly monitors the state of the electric device 50.

As shown in FIG. 5, in a case where the variable-speed electric motor 71 trips due to failure, power outage or the like, the control unit 120 of the variable-speed speed-up mechanism 1 of the present embodiment executes an inverter tripping step S1, the constant-speed electric motor stopping step S2, the variable-speed electric motor state determining step S3, and a clutch device operating step S6.

In the inverter tripping step S1, the control unit 120 detects an abnormality or failure of the rotational speed control device 100 (inverter) and the variable-speed electric motor 71 and causes the rotational speed control device 100 of the variable-speed electric motor 71 to trip (stop).

In the constant-speed electric motor stopping step S2, the control unit 120 turns off the constant-speed electric motor switch 112 and places the constant-speed electric motor 51 to be in the power cut state. By placing the constant-speed electric motor 51 in the power cut state, the constant-speed electric motor 51 (the constant-speed rotor 52) freely runs (rotates with inertia).

In the variable-speed electric motor state determining step S3, the control unit 120 determines whether or not the variable-speed electric motor 71 is tripping. In a case where the variable-speed electric motor 71 trips, the clutch device operating step S6 is executed.

In the clutch device operating step S6, the control unit 120 blocks the rotation transmitted from the constant-speed rotor 52 to the internal gear carrier shaft 37 using the constant-speed clutch 57 which is the clutch device 3. Accordingly, the rotation of the constant-speed rotor 52 having a large moment of inertia is not transmitted to the variable-speed electric motor 71 via the internal gear carrier shaft 37 and the transmission device 10.

Accordingly, as shown in step S7, the constant-speed electric motor 51, the variable-speed electric motor 71, and the output shaft Ao freely run.

According to the above-described variable-speed speed-up mechanism stopping method, the constant-speed rotor 52, the variable-speed rotor 72, and the output shaft Ao rotate with inertia, the rotational speed gradually decreases, and accordingly, it is possible to stop the variable-speed speed-up mechanism 1.

In other words, in a case where the variable-speed electric motor 71 trips, it is possible to stop the variable-speed speed-up mechanism 1 by controlling the clutch device 3.

According to the present embodiment, in a case where at least one of the constant-speed electric motor 51 and the variable-speed electric motor 71 configuring the electric device 50 trips, it is possible to prevent the variable-speed electric motor 71 from excessively rotating.

In other words, in a case where the variable-speed electric motor 71 trips, the rotation transmitted from the constant-speed rotor 52 to the internal gear carrier shaft 37 is blocked by using the clutch device 3. Accordingly, the rotation of the constant-speed rotor 52 having a large moment of inertia is not transmitted to the variable-speed electric motor 71 via the transmission device 10, and it is possible to prevent the variable-speed electric motor 71 from excessively rotating.

In addition, in a case where only the constant-speed electric motor 51 trips, it is possible to stop the variable-speed speed-up mechanism 1 only by controlling the variable-speed electric motor 71 without controlling the clutch device 3.

In addition, in the present embodiment, the internal gear carrier shaft 37 which is a rod-shaped shaft is inserted into the variable-speed rotor shaft 73 which is a cylindrical shaft formed with the shaft insertion hole 74. In other words, the constant-speed input shaft Ac having a large output is inserted into the variable-speed rotor shaft 73 of the variable-speed electric motor 71 having a smaller output than that of the constant-speed electric motor 51. Accordingly, it is possible to adopt a constant-speed electric motor 51 having a larger output (horsepower).

Further, in the present embodiment, since the constant-speed electric motor 51, the variable-speed electric motor 71, the transmission device, and the compressor C are linearly arranged in this order, the whole device can be made more compact.

In addition, in the above-described embodiment, the constant-speed electric motor 51 is in the power cut state before the rotation of the constant-speed rotor 52 is blocked by using the clutch device 3. However, the present invention is not limited thereto, and the rotation of the constant-speed rotor 52 may be blocked by using the clutch device 3 without the tipping of the constant-speed electric motor 51.

Second Embodiment

Hereinafter, a variable-speed speed-up mechanism of a second embodiment of the present invention will be described in detail with reference to the drawings. In addition, in the present embodiment, differences from the above-described first embodiment will be mainly described, and the description of similar parts will be omitted.

The clutch device 3 of the present embodiment is a variable-speed clutch 38 which transmits or blocks the rotation of the variable-speed electric motor 71.

Figure 6:
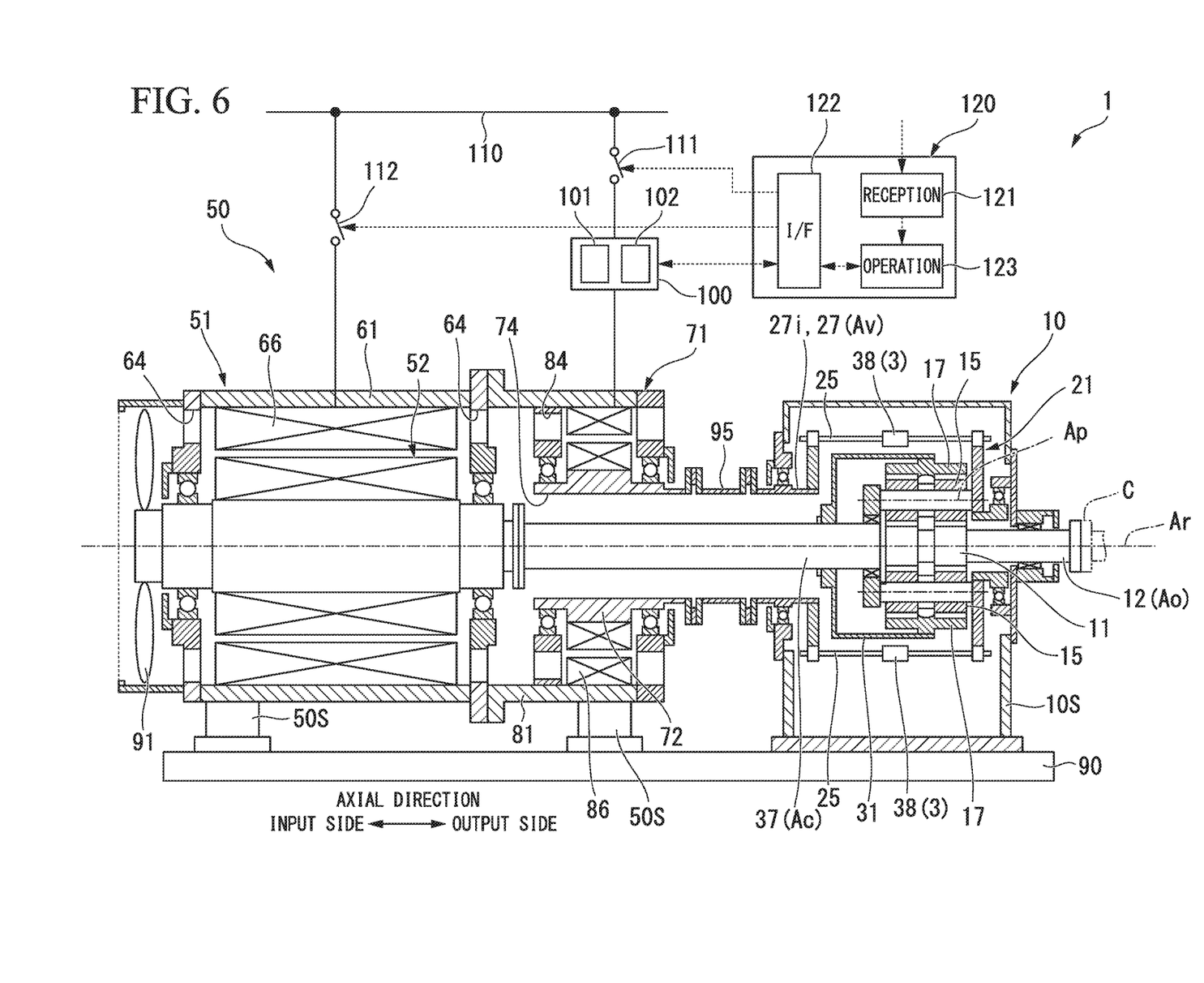
FIG. 6 is a sectional view of a variable-speed speed-up mechanism of a second embodiment according to the present invention.

As shown in FIG. 6, the transmission device 10 of the variable-speed speed-up mechanism 1 of the present embodiment has a variable-speed clutch 38 provided on the transmission device shaft 25.

Figure 7:
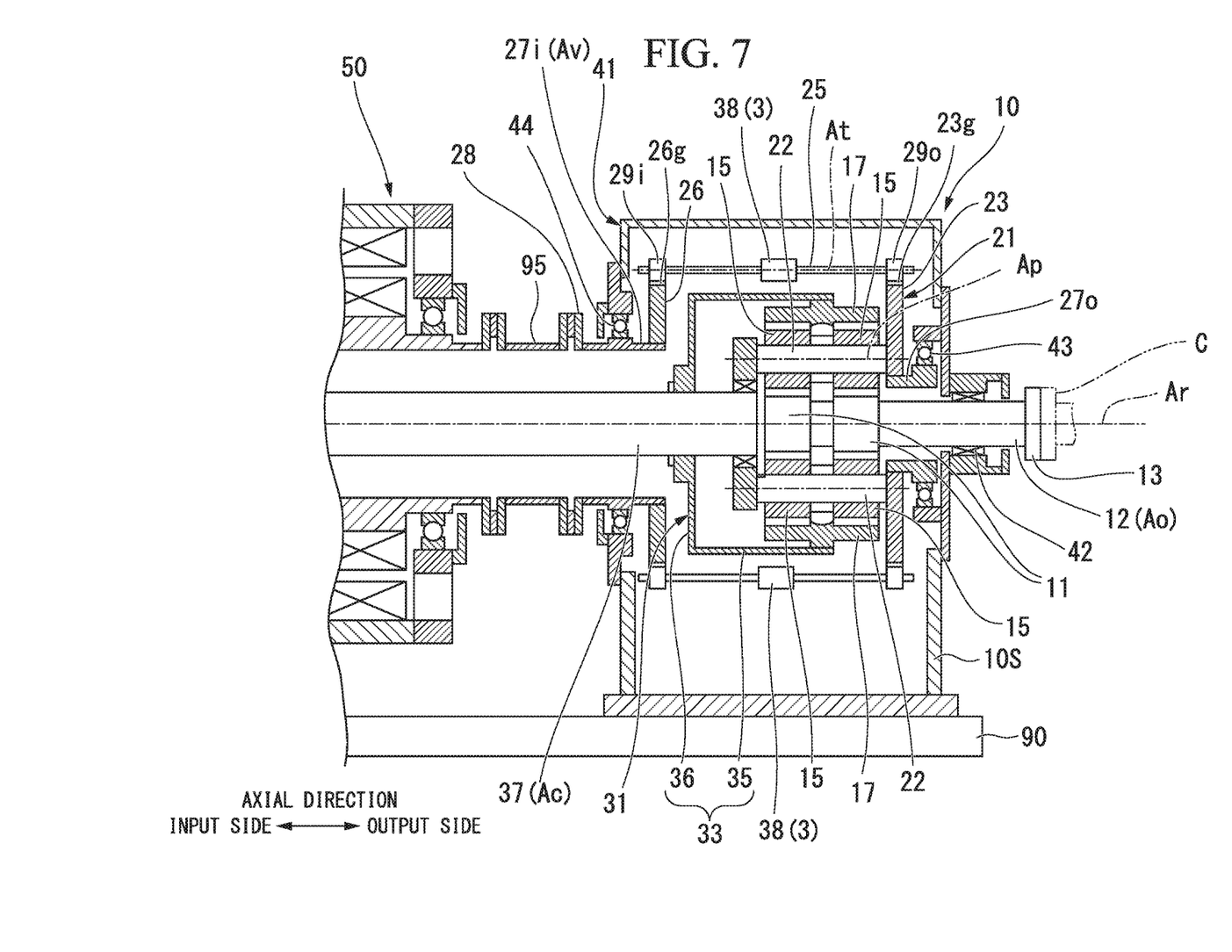
FIG. 7 is a sectional view of a transmission device of the second embodiment according to the present invention.

As shown in FIG. 7, the variable-speed clutch 38 is a device which transmits or blocks the rotation of the variable-speed rotor 72 to the planetary gear carrier shaft 27 which is the variable-speed input shaft Av. The variable-speed clutch 38 of the present embodiment transmits or blocks the rotation transmitted from the input side planetary gear carrier shaft 27i to the planetary gear carrier 21.

The variable-speed clutch 38 is a clutch similar to the constant-speed clutch 57.

In addition, an installation position of the variable-speed clutch 38 provided in the transmission device 10 is not limited to the place on the transmission device shaft 25. The variable-speed clutch 38 may transmit or block the rotation of the variable-speed rotor 72 (the variable-speed rotor shaft 73) to the planetary gear carrier shaft 27 which is the variable-speed input shaft Av, and for example, a variable-speed flexible coupling may be used as a clutch.

Similar to the control unit 120 of the variable-speed speed-up mechanism 1 of the first embodiment, the control unit 120 of the variable-speed speed-up mechanism 1 of the present embodiment has a function of preventing excessive rotation of the variable-speed electric motor 71 in a case where at least one of the constant-speed electric motor 51 and the variable-speed electric motor 71 trips.

The variable-speed speed-up mechanism stopping method executed by the control unit 120 of the variable-speed speed-up mechanism 1 of the present embodiment is the same as the variable-speed speed-up mechanism stopping method of the first embodiment except that the variable-speed clutch 38 is controlled as the clutch device 3.

According to the variable-speed speed-up mechanism 1 of the present embodiment, similarly to the variable-speed speed-up mechanism 1 of the first embodiment, in a case where at least one of the constant-speed electric motor 51 and the variable-speed electric motor 71 configuring the electric device 50 has tripped, it is possible to prevent the excessive rotation of the variable-speed electric motor 71.

In addition, the constant-speed clutch 57 is described as the clutch device 3 in the first embodiment, and the variable-speed clutch 38 is described as the clutch device 3 in the second embodiment, but both the constant-speed clutch 57 and the variable-speed clutch 38 may be provided in the variable-speed speed-up mechanism 1.

Third Embodiment

Next, with reference to FIG. 8, a transmission device 10A of a third embodiment will be described.

In the third embodiment, the same configuration elements as those of the first and second embodiments are denoted by the same reference numerals, and the detailed description thereof will be omitted. The internal structure of the transmission device 10A of the third embodiment is different from that of the first embodiment.

In the transmission device 10A of the third embodiment, the gear which was the internal gear in the first embodiment is the external gear. Therefore, the gear carrier shaft which was the internal gear carrier shaft in the first embodiment is the external gear carrier shaft.

Figure 8:
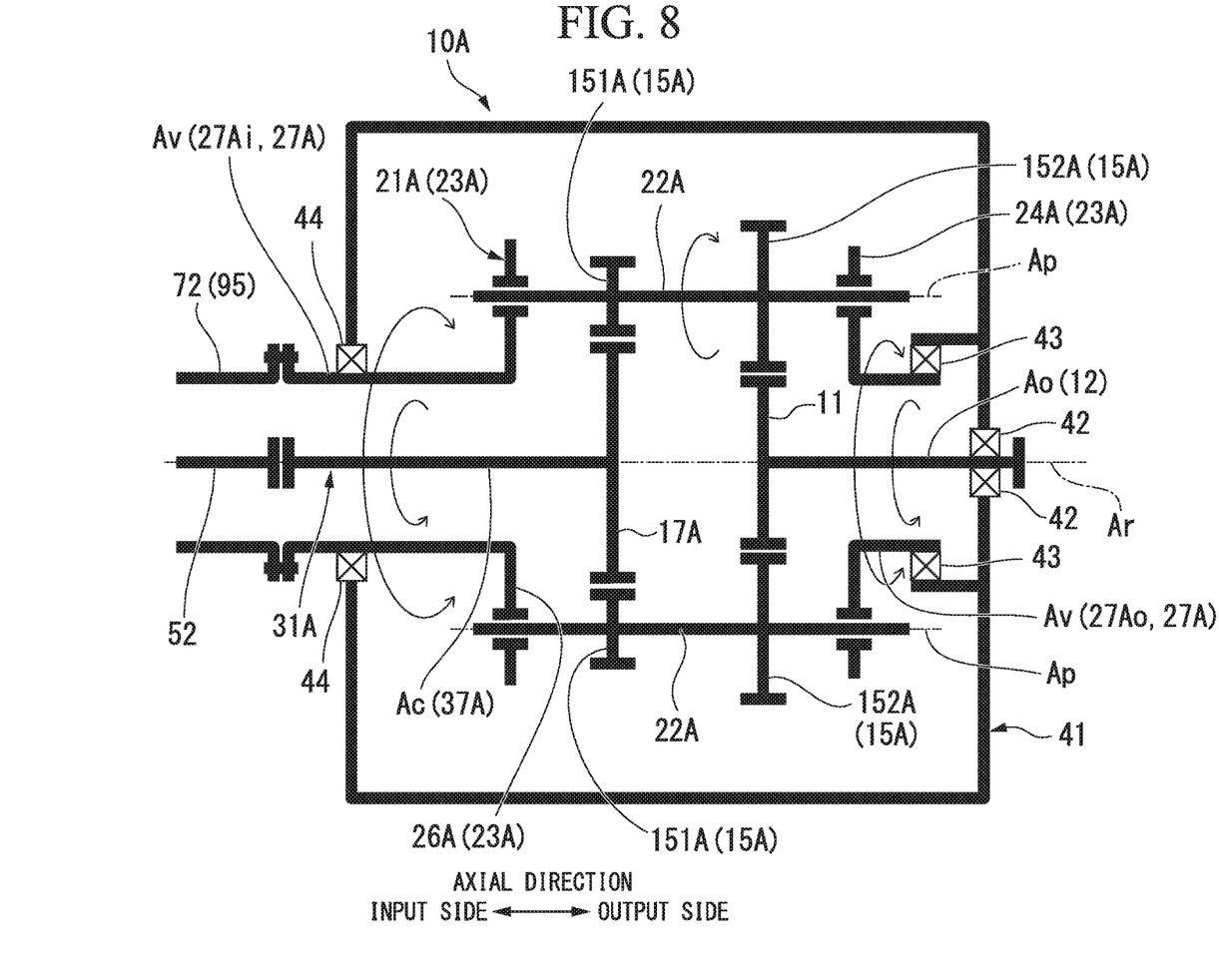
FIG. 8 is a schematic view showing a configuration of a transmission device of a third embodiment according to the present invention.

Specifically, as shown in FIG. 8, the transmission device 10A of the third embodiment includes the sun gear 11, the sun gear shaft 12, a planetary gear 15A, an external gear (gear) 17A, a planetary gear carrier 21A, an external gear carrier (gear carrier) 31A, and the transmission device casing 41 which covers the members.

The planetary gear 15A of the third embodiment includes a plurality of first planetary gears (primary gears) 151A and a plurality of second planetary gears (secondary gears) 152A.

The first planetary gear 151A meshes with the external gear 17A. The first planetary gear 151A revolves around the axis line Ar and also rotates around the center line Ap thereof.

The second planetary gear 152A meshes with the sun gear 11. The second planetary gear 152A revolves around the axis line Ar and also rotates around the center line Ap that is also the same center line as the first planetary gear 151A. The second planetary gear 152A is disposed further on the output side in the axial direction than the first planetary gear 151A. One of the second planetary gears 152A is rotatable integrally with one of the first planetary gears 151A. In other words, one first planetary gear 151A is disposed in a pair with respect to one second planetary gear 152A.

The planetary gear carrier 21A of the third embodiment includes a planetary gear shaft 22A, a planetary gear carrier main body 23A, and a planetary gear carrier shaft 27A.

The planetary gear shaft 22A is provided for each of the plurality of planetary gears 15A. The planetary gear shaft 22A allows the first planetary gear 151A and the second planetary gear 152A which are connected to each other around the center line Ap to be rotatable. The planetary gear shaft 22A connects one second planetary gear 152A to one first planetary gear 151A. Specifically, the first planetary gear 151A is connected to the input side in the axial direction of the planetary gear shaft 22A, and the second planetary gear 152A is connected to the output side in the axial direction of the planetary gear shaft 22A. The planetary gear shaft 22A penetrates the first planetary gear 151A and the second planetary gear 152A in the axial direction. Therefore, an end portion on the input side in the axial direction of the planetary gear shaft 22A is positioned further on the input side in the axial direction than the first planetary gear 151A. In addition, an end portion on the output side in the axial direction of the planetary gear shaft 22A is positioned further on the output side in the axial direction than the second planetary gear 152A.

The planetary gear carrier main body 23A fixes mutual positions of the plurality of planetary gear shafts 22A. The planetary gear carrier main body 23A includes a planetary gear output side arm portion 24A and a planetary gear input side arm portion 26A.

The planetary gear output side arm portion 24A rotatably supports the end portion on the output side in the axial direction of the plurality of planetary gear shafts 22A. The planetary gear input side arm portion 26A rotatably supports the end portion on the input side in the axial direction of the plurality of planetary gear shafts 22A. In this manner, by supporting the planetary gear shaft 22A via the planetary gear carrier main body 23A, the planetary gear carrier 21A coaxially supports the first planetary gear 151A and the second planetary gear 152A.

The planetary gear carrier shaft 27A fixes the planetary gear carrier main body 23A. The planetary gear carrier shaft 27A extends in the axial direction around the axis line Ar. The planetary gear carrier shaft 27A includes an output side planetary gear carrier shaft 27Ao which extends from the planetary gear output side arm portion 24A to the output side, and an input side planetary gear carrier shaft 27Ai which extends from the planetary gear input side arm portion 26A to the input side. Both of the output side planetary gear carrier shaft 27Ao and the input side planetary gear carrier shaft 27Ai form a cylindrical shape around the axis line Ar.

The output side planetary gear carrier shaft 27Ao is supported by the planetary gear carrier bearing 43 so as to be rotatable around the axis line Ar with respect to the transmission device casing 41. In the planetary gear carrier bearing 43, the sun gear shaft 12 is inserted into the inner circumferential side of the output side planetary gear carrier shaft 27Ao disposed further on the output side than the planetary gear output side arm portion 24A.

The input side planetary gear carrier shaft 27Ai is supported by the planetary gear carrier bearing 44 so as to be rotatable around the axis line Ar with respect to the transmission device casing 41. The planetary gear carrier bearing 44 is disposed closer to the input side than the planetary gear input side arm portion 26A. An external gear carrier shaft 37A which will be described later is inserted into the inner circumferential side of the input side planetary gear carrier shaft 27Ai.

The external gear carrier 31A supports the external gear 17A to be rotatable around the axis line Ar. The external gear carrier 31A includes the external gear carrier shaft 37A connected to the external gear 17A.

The external gear carrier shaft 37A is fixed to the external gear 17A and extends in the axial direction around the axis line Ar. The external gear carrier shaft 37A forms a columnar shape around the axis line Ar. The external gear carrier shaft 37A extends from the external gear 17A to the input side in the axial direction. The input side part of the external gear carrier shaft 37A is inserted into the inner circumferential side of the cylindrical input side planetary gear carrier shaft 27Ai.

According to the variable-speed speed-up mechanism 1 including the transmission device 10A described above, similarly to the first embodiment, in a case where at least one of the constant-speed electric motor 51 and the variable-speed electric motor 71 configuring the electric device 50 has tripped, it is possible to prevent the excessive rotation of the variable-speed electric motor 71.

In addition, the gear which meshes with the planetary gears 15 and 15A may be either the internal gear 17 as in the first embodiment or the external gear 17A as in the third embodiment, but the number thereof is not limited to the configuration of the embodiment. Therefore, for example, the gear which meshes with the planetary gear 15 may be configured to have two or more internal gears 17 as in the first embodiment. In addition, the gear which meshes with the planetary gear 15A may be configured to have only one or three or more external gears 17A as in the third embodiment.

Above, although the embodiments of the present invention have been described in detail, various modifications can be made without departing from the technical idea of the present invention.

For example, in the above-described embodiment, a four-pole three-phase induction electric motor is exemplified as the constant-speed electric motor 51 that is appropriate for rotating the compressor C at high speed, and an eight-pole three-phase induction electric motor is exemplified as the variable-speed electric motor 71 that is appropriate for variably changing the rotational speed of the compressor C within a certain range. However, in a case where it is not necessary to rotate the target to be driven at high speed, other types of electric motors may be used as the constant-speed electric motor 51 or the variable-speed electric motor 71.

In addition, the variable-speed input shaft Av of the transmission device 10 and the variable-speed rotor 72 of the electric device 50 are not limited to being coaxially connected as in the present embodiment. For example, the variable-speed rotor 72 may be connected to the variable-speed input shaft Av via a connection structure, such as another gear. Therefore, the variable-speed speed-up mechanism 1 of the present embodiment is not limited to a structure in which one variable-speed electric motor 71 is connected to one transmission device 10. For example, a plurality of variable-speed rotors 72 may be connected to one variable-speed input shaft Av such that a plurality of variable-speed electric motors 71 are connected to one transmission device 10.

REFERENCE SIGNS LIST

1 VARIABLE-SPEED SPEED-UP MECHANISM
3 CLUTCH DEVICE
10, 10A TRANSMISSION DEVICE
11 SUN GEAR
12 SUN GEAR SHAFT
15, 15A PLANETARY GEAR
17 INTERNAL GEAR (GEAR)
21, 21A PLANETARY GEAR CARRIER
22, 22A PLANETARY GEAR SHAFT
23, 23A PLANETARY GEAR CARRIER MAIN BODY
27, 27A PLANETARY GEAR CARRIER SHAFT
27i, 27Ai INPUT SIDE PLANETARY GEAR CARRIER SHAFT 27o, 27Ao OUTPUT SIDE PLANETARY GEAR CARRIER SHAFT
31 INTERNAL GEAR CARRIER (GEAR CARRIER)
37 INTERNAL GEAR CARRIER SHAFT (GEAR CARRIER SHAFT)
38 VARIABLE-SPEED CLUTCH
41 TRANSMISSION DEVICE CASING
42 SUN GEAR BEARING
43, 44 PLANETARY GEAR CARRIER BEARING
50 ELECTRIC DEVICE
51 CONSTANT-SPEED ELECTRIC MOTOR
52 CONSTANT-SPEED ROTOR
53 CONSTANT-SPEED ROTOR SHAFT
56 CONDUCTOR
57 CONSTANT-SPEED CLUTCH
61 CONSTANT-SPEED ELECTRIC MOTOR CASING
66 CONSTANT-SPEED STATOR
71 VARIABLE-SPEED ELECTRIC MOTOR
72 VARIABLE-SPEED ROTOR
73 VARIABLE-SPEED ROTOR SHAFT
74 SHAFT INSERTION HOLE
76 CONDUCTOR
81 VARIABLE-SPEED ELECTRIC MOTOR CASING
86 VARIABLE SPEED STATOR
100 ROTATIONAL SPEED CONTROL DEVICE
101 FREQUENCY CONVERSION UNIT
102 ROTATIONAL DIRECTION-CHANGING UNIT
110 POWER SOURCE LINE
111 VARIABLE-SPEED ELECTRIC MOTOR SWITCH
112 CONSTANT-SPEED ELECTRIC MOTOR SWITCH
120 CONTROL UNIT (CONTROL DEVICE)
121 RECEPTION UNIT
122 INTERFACE
123 OPERATION UNIT
Ac CONSTANT-SPEED INPUT SHAFT
Ao OUTPUT SHAFT
Ar AXIS LINE
Av VARIABLE-SPEED INPUT SHAFT
C COMPRESSOR
17A EXTERNAL GEAR (GEAR)
31A EXTERNAL GEAR CARRIER (GEAR CARRIER)
37A EXTERNAL GEAR CARRIER SHAFT (GEAR CARRIER SHAFT)
24A PLANETARY GEAR OUTPUT SIDE ARM PORTION
26A PLANETARY GEAR INPUT SIDE ARM PORTION
151A FIRST PLANETARY GEAR (PRIMARY GEAR)
152A SECOND PLANETARY GEAR (SECONDARY GEAR)

What is claimed is:

1. A variable-speed speed-up mechanism comprising:
an electric device which is configured to generate a rotational driving force; and
a planetary gear transmission device which is configured to change the speed of the rotational driving force transmitted from the electric device to a constant-speed input shaft and a variable-speed input shaft and transmit the rotational driving force to a target to be driven via an output shaft,
wherein the electric device includes
a constant-speed electric motor including a constant-speed rotor which is configured to rotate the constant-speed input shaft of the planetary gear transmission device, and
a variable-speed electric motor including a variable-speed rotor which is configured to rotate the variable-speed input shaft of the planetary gear transmission device, and
wherein the variable-speed speed-up mechanism further includes
a clutch device including at least one of the group consisting of a constant-speed clutch for transmitting or blocking the rotation of the constant-speed rotor to the constant-speed input shaft and a variable-speed clutch for transmitting or blocking the rotation of the variable-speed rotor to the variable-speed input shaft, and
a control device which is configured to block the rotation of at least one of the constant-speed rotor and the variable-speed rotor by using the clutch device in a case where the variable-speed electric motor trips.

2. The variable-speed speed-up mechanism according to claim 1,
wherein the planetary gear transmission device includes
a sun gear which is configured to rotate around an axis line,
a sun gear shaft which is fixed to the sun gear and extends in an axial direction around the axis line,
a planetary gear which is configured to mesh with the sun gear and revolves around the axis line, and to rotate around a center line thereof,
a gear of which a plurality of teeth are arranged in an annular shape around the axis line, and which is configured to mesh with the planetary gears,
a planetary gear carrier which has a planetary gear carrier shaft that extends in the axial direction around the axis line and supports the planetary gear to be capable of revolving around the axis line and to be rotatable around the center line of the planetary gear itself, and
a gear carrier which has a gear carrier shaft that extends in the axial direction around the axis line and supports the gear to be rotatable around the axis line,
wherein the sun gear shaft forms the output shaft connected to the target to be driven, the gear carrier shaft forms the constant-speed input shaft, and the planetary gear carrier shaft forms the variable-speed input shaft,
wherein the variable-speed rotor and the planetary gear carrier shaft are formed in a cylindrical shape around the axis line, and shaft insertion holes are formed penetrating in the axial direction, and
wherein the constant-speed rotor is inserted into the shaft insertion holes.

3. The variable-speed speed-up mechanism according to claim 2,
wherein the gear is an internal gear, and
wherein the gear carrier shaft is an internal gear carrier shaft.

4. The variable-speed speed-up mechanism according to claim 2,
wherein the gear is an external gear,
wherein the gear carrier shaft is an external gear carrier shaft,
wherein the planetary gear includes a primary gear which meshes with the external gear and a secondary gear which meshes with the sun gear, and
wherein the planetary gear carrier coaxially supports the primary gear and the secondary gear.

5. The variable-speed speed-up mechanism according to claim 1,
wherein the control performs control to lower the rotational speed of the variable-speed electric motor in a case where only the constant-speed electric motor trips.

6. The variable-speed speed-up mechanism according to claim 2,
   wherein the control performs control to lower the rotational speed of the variable-speed electric motor when only the constant-speed electric motor trips.

7. The variable-speed speed-up mechanism according to claim 3,
   wherein the control performs control to lower the rotational speed of the variable-speed electric motor when only the constant-speed electric motor trips.

8. The variable-speed speed-up mechanism according to claim 4,
   wherein the control performs control to lower the rotational speed of the variable-speed electric motor when only the constant-speed electric motor trips.

\* \* \* \* \*